United States Patent [19]

Mori et al.

[11] Patent Number: 5,781,662
[45] Date of Patent: Jul. 14, 1998

[54] INFORMATION PROCESSING APPARATUS AND METHOD THEREFOR

[75] Inventors: Shigeki Mori, Koshigaya; Kazutoshi Shimada, Yokosuka; Eisaku Tatsumi, Kawasaki; Kazuhiro Matsubayashi, Yokohama; Shinichi Sunakawa, Kawasaki; Takashi Harada, Yokohama; Katsuhiko Nagasaki, Ichikawa; Ryoji Fukuda, Yokohama, all of Japan

[73] Assignee: Canon Kabushiki Kaisha, Tokyo, Japan

[21] Appl. No.: 473,361

[22] Filed: Jun. 7, 1995

[30] Foreign Application Priority Data

Jun. 21, 1994 [JP] Japan .................. 6-138577

[51] Int. Cl.$^6$ .................. G06K 9/00; G06K 9/18; G06K 9/03
[52] U.S. Cl. .................. 382/189; 345/358; 382/186; 382/187; 382/310; 382/311
[58] Field of Search .................. 382/181, 182, 382/185, 186, 187, 189, 217, 218, 231, 309–311; 395/149; 364/419.1; 345/358, 156, 173, 179

[56] References Cited

U.S. PATENT DOCUMENTS 5,365,598  11/1994  Sklarew .................. 382/189
5,398,310  3/1995   Tchao et al. .................. 395/144
5,410,612  4/1995   Arai et al. .................. 382/13
5,448,475  9/1995   Senoo et al. .................. 382/187
5,455,901  10/1995  Friend et al. .................. 382/187
5,479,596  12/1995  Capps et al. .................. 395/148
5,517,578  5/1996   Altman et al. .................. 382/182
5,528,743  6/1996   Tou et al. .................. 382/182
5,550,930  8/1996   Berman et al. .................. 382/187
5,566,248  10/1996  Ulrich .................. 382/182

*Primary Examiner*—Bipin Shalwala
*Attorney, Agent, or Firm*—Fitzpatrick, Cella, Harper & Scinto

[57] ABSTRACT

Handwritten/input stroke data is compared with a gesture dictionary. If the data coincides with a specific gesture, it is checked whether the gesture is completed, and the stroke data is stored. After the meaning of the gesture command is analyzed by using the gesture dictionary, an image stroke data group which does not coincide with any gesture, and an icon group replacing stroke data which coincides with a gesture appears on the display screen. In this state, when the user taps icons having functions as gestures he/she wants to execute, the corresponding gesture commands are executed.

24 Claims, 8 Drawing Sheets

It's fine today.
⇓
It's fine today.

It's fine today.
⇓
It's today.

INFORMATION PROCESSING APPARATUS AND METHOD THEREFOR

BACKGROUND OF THE INVENTION

1. Field of the Invention

The present invention relates to an information processing apparatus and a method therefor capable of inputting information by operating a pen.

2. Description of the Related Art

In, for example, a conventional electronic information apparatus for inputting information by operating a pen, two types of input methods are employed: an information input method of inputting characters and symbols by using a means for recognizing handwritten characters; and a method of inputting commands called "gestures" in the apparatus body by operating a pen.

In an electronic information apparatus equipped with a word processor application for displaying characters on the display screen, when handwritten characters are input to arbitrarily positions as shown in, e.g., FIGS. 8A and 8B, recognition processing for the characters is performed, and the recognition results are displayed at the positions where the handwriting input operation was performed.

In this case, when the mark "X" as a "gesture" indicating a delete command is handwritten on a word of a displayed character string as shown in FIGS. 9A and 9B, recognition processing of the gesture is performed, and the gesture serves as a command for deleting the word on which it is handwritten.

Similarly, with the preparation of gestures, as commands, having various functions required for the word processor application, an edit operation environment is provided as well as the function of inputting characters by only operating a pen.

In the electronic information apparatus having the above arrangement, however, the following problem is posed when the apparatus is equipped with an application, e.g., DTP (desktop publishing, which allows input of not only characters but also graphic patterns arbitrarily drawn by handwriting. When a graphic pattern identical to a graphic pattern prepared as a gesture is drawn, the conventional electronic information apparatus cannot discriminate them at all.

In order to avoid the above situation, the operator may switch the current mode to a special input mode. Alternatively, every time graphic patterns cannot be discriminated, the operator may perform confirmation. In either case, an extra operation load is repetitively imposed on the operator in a data input operation.

SUMMARY OF THE INVENTION

The present invention has been made in consideration of the above problem, and has as its object to provide an electronic information apparatus which can easily identify a handwritten graphic pattern and a graphic pattern as a gesture.

In order to achieve the above object, according to the present invention, there is provided an information processing apparatus and a method therefor capable of processing handwritten information input through a display screen, comprising means for storing gesture strokes associated with a plurality of gesture commands in advance, means for inputting handwritten image stroke data, determination means for determining whether the handwritten image stroke data includes a stroke identical to one of the gesture strokes, means for, when the determination means determines the presence of an identical stroke, analyzing a gesture operation indicated by the stroke, means for displaying a predetermined symbol corresponding to the gesture operation on the display screen in accordance with the analysis, judging means for judging the presence/absence of an access to the displayed predetermined symbol, and selection means for selecting, in accordance with the presence/absence of the access, whether to execute the gesture operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A and 8B are views showing display samples in a conventional electronic information apparatus; and FIGS. 9A and 9B are view showing display samples in a conventional electronic information apparatus.

DETAILED DESCRIPTION OF THE PREFERRED EMBODIMENT

A preferred embodiment of the present invention will be described below with reference to the accompanying drawings.

Figure 1:
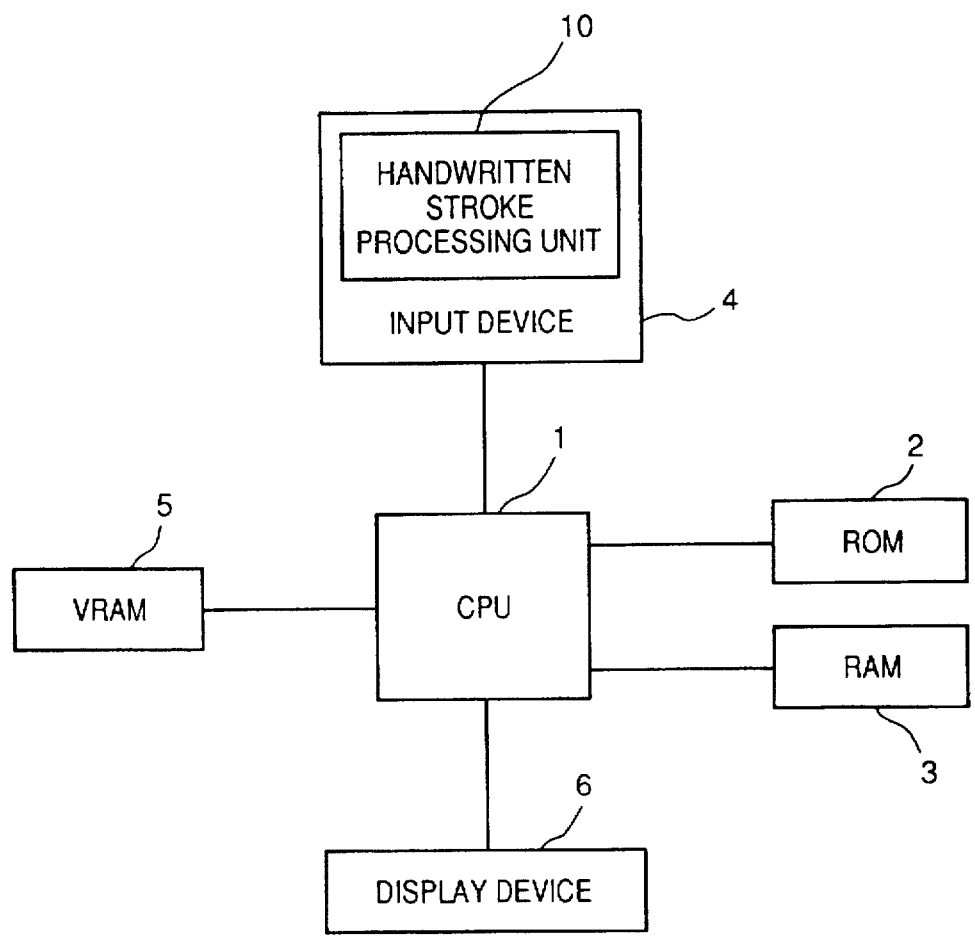
FIG. 1 is a block diagram showing the schematic arrangement of an information processing apparatus according to an embodiment of the present invention.

FIG. 1 is a block diagram showing the schematic arrangement of an information processing apparatus according to an embodiment of the present invention. Referring to FIG. 1, reference-numeral 1 denotes a CPU (central processing unit) for controlling the overall apparatus. The CPU 1 performs various processes in accordance with programs stored in a ROM 2. A control program, an error processing program, a program based on a flow chart to be described later, and the like are stored in the ROM 2.

Reference numeral 3 denotes a RAM used as work areas for various programs and a save area in error processing. Various data such as dictionary and stroke string data used for recognition processing (to be described later) are stored in the RAM 3. Reference numeral 4 denotes an input device serving as a coordinate input unit having a transparent coordinate input board (not shown) and a pen (not shown) for designating the position of a coordinate point with respect to the coordinate input board. This input unit uses a scheme based on electromagnetic induction or ultrasonic vibration in detecting a coordinate point.

Reference numeral 5 denotes a VIDEO RAM (to be referred to as a VRAM hereinafter) having memory areas in one-to-one correspondence with the coordinate points of the coordinate input board (not shown) and serving to store bit information of an input coordinate point of the coordinate input board or bit information of a dot (to be described later) calculated on the basis of a coordinate point; and 6, a display unit for displaying a bit image on the basis of bit information stored in the VRAM 5. In this case, as the display device 6, an LCD is used. However, a display scheme based on an EL device or a CRT may be used. Stroke string information is displayed on the display device 6.

Figure 2:
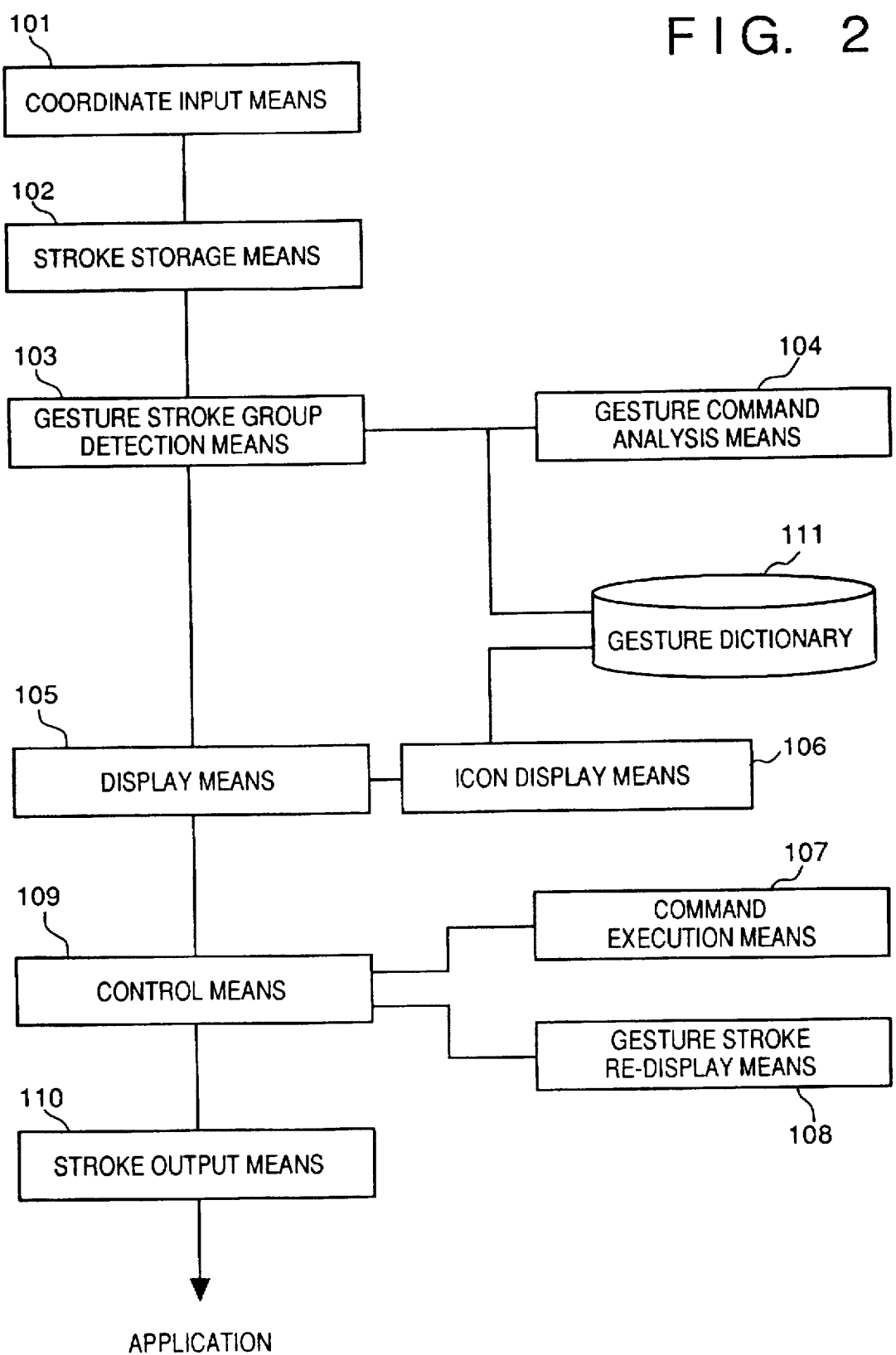
FIG. 2 is a block diagram showing the schematic arrangement of a handwritten stroke processing unit constituting an input device according to the embodiment.

FIG. 2 is a block diagram showing the schematic arrangement of a handwritten stroke processing unit 10 constituting the input device 4 in FIG. 1. Referring to FIG. 2, reference numeral 101 denotes a coordinate input means for inputting a handwritten stroke; 102, a stroke storage means for storing stroke string data obtained by the coordinate input means 101; and 103, a gesture stroke group detection means for comparing the stroke string data stored in the stroke storage means 102 with gesture stroke data by a conventional character recognition method such as pattern matching on the basis of a gesture dictionary 111.

Reference numeral 104 denotes a gesture command analysis means for analyzing the gesture recognized/detected by the gesture stroke group detection means 103 on the basis of the gesture dictionary 111 to determine the type of command; and 105, a display means for outputting the stroke string data stored in the stroke storage means 102 to the display device.

Reference numeral 106 denotes an icon display means for displaying the gesture command analyzed by the gesture stroke group detection means 103 and the gesture command analysis means 104 as an icon; 107, a command execution means for executing a command corresponding to the icon displayed on the icon display means 106 on the basis of the analysis result obtained by the gesture command analysis means 104; and 108, a gesture stroke re-display means for restoring a stroke group icon to the stroke group and displaying it.

Reference numeral 109 denotes a control means of the information processing apparatus of this embodiment. The control means 109 performs control to notify the gesture stroke re-display means 108 of the timings of storage and printing of document data with respect to handwritten stroke processing. Reference numeral 110 denotes a stroke output means for performing an output operation in the stroke processing unit 10 with respect to an application.

The gesture dictionary 111 stores data used to detect a gesture stroke in the gesture stroke group detection means 103 and establish correlation between a gesture stroke and a command in the gesture command analysis means 104.

FIG. 2 shows only the stroke processing unit 10 associated with the information processing apparatus according to this embodiment. Since a means for a handwriting input operation, other input/output means, a gesture recognition means, and installed applications are not directly associated with the present invention, an illustration and description thereof will be omitted.

Assume that stroke data is input by the coordinate input means 101 shown in FIG. 2 in the information processing apparatus according to this embodiment. An operation to be performed in this case will be described in detail below.

Figure 3:
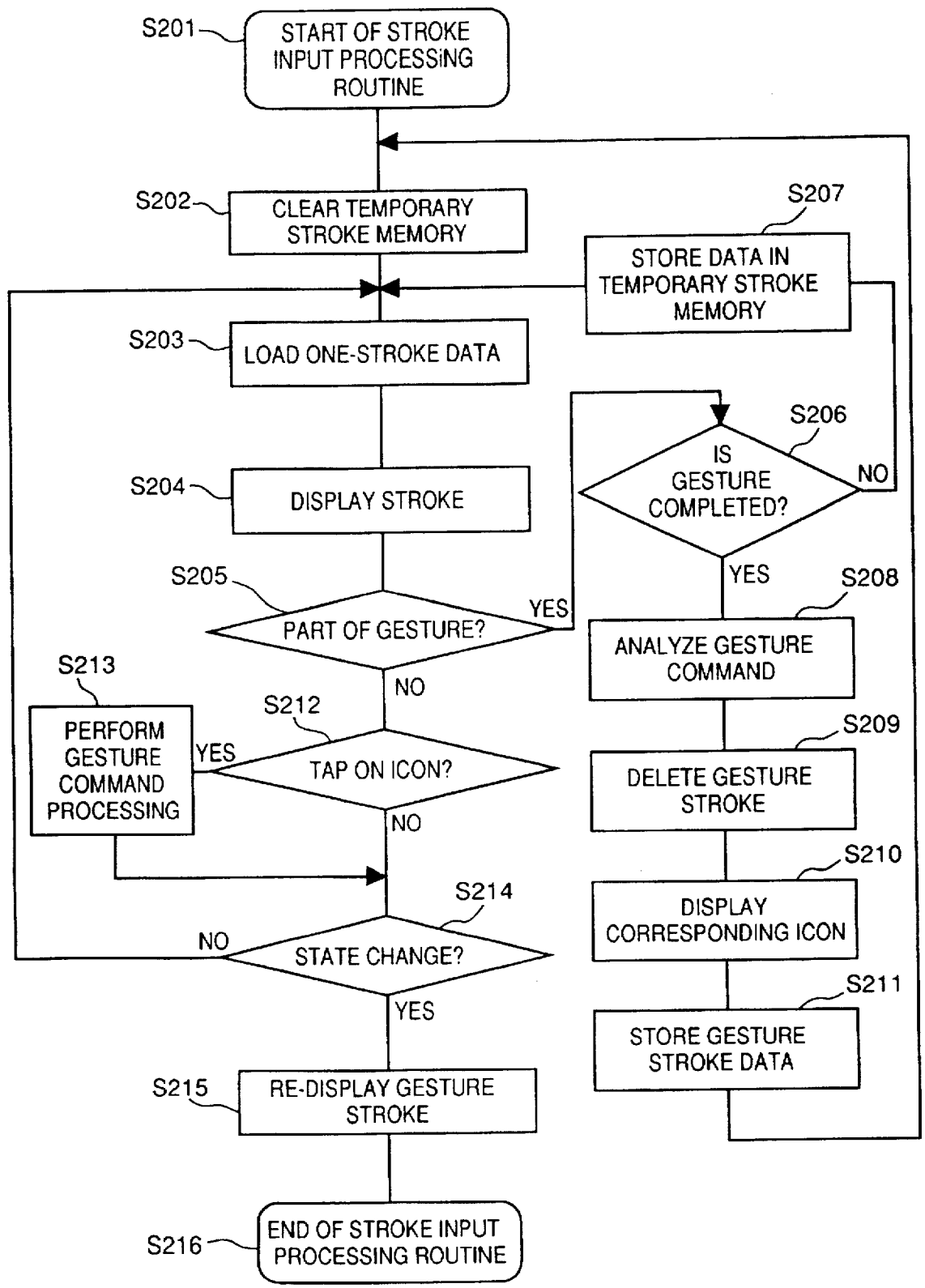
FIG. 3 is a flow chart showing a sequence in the handwritten stroke in FIG. 2.

FIG. 3 is a flow chart showing an actual procedure in the stroke processing unit 10 having the arrangement shown in FIG. 2. FIGS. 4A, 4B, 5, and 6 show examples of stroke data input to the input device of the information processing apparatus of this embodiment, with each stroke data being sequentially drawn with time.

Figure 4A:
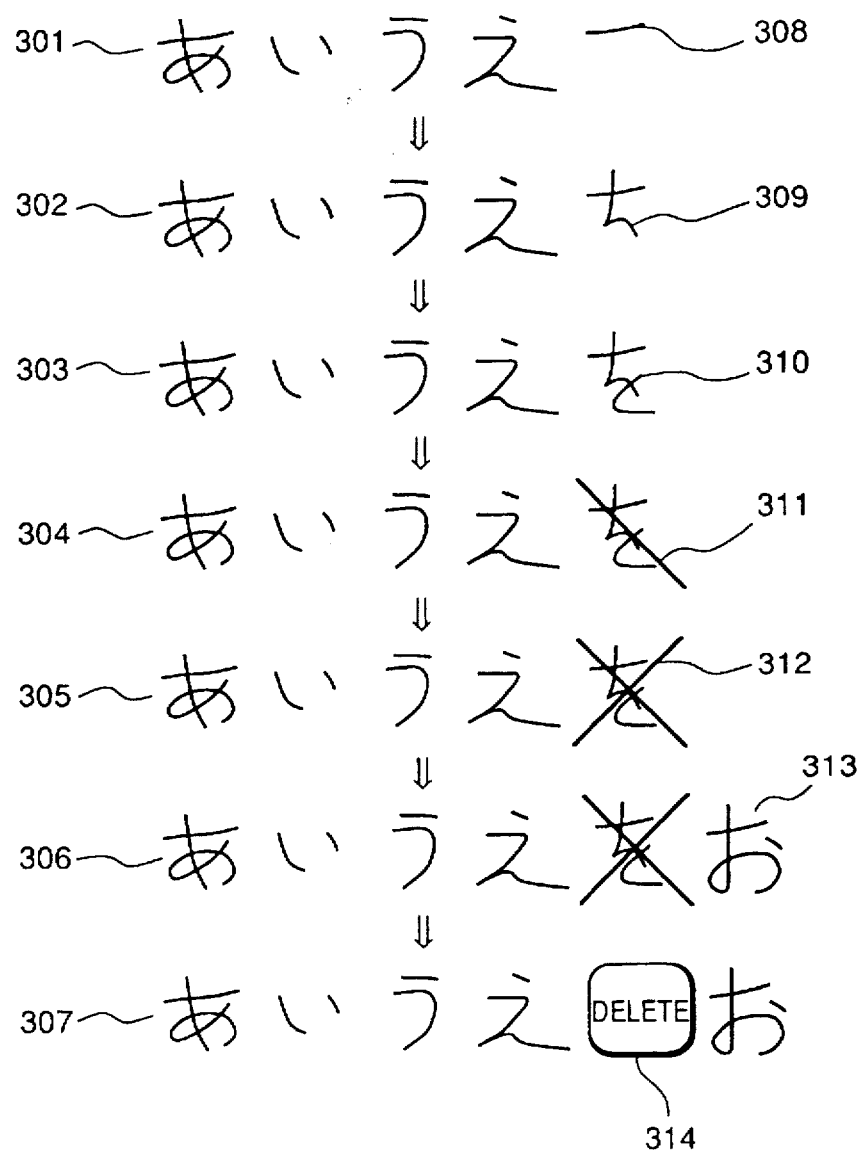
FIG. 4A is a view showing an example of stroke data of a Japanese kana character which is sequentially drawn with time.
Figure 4B:
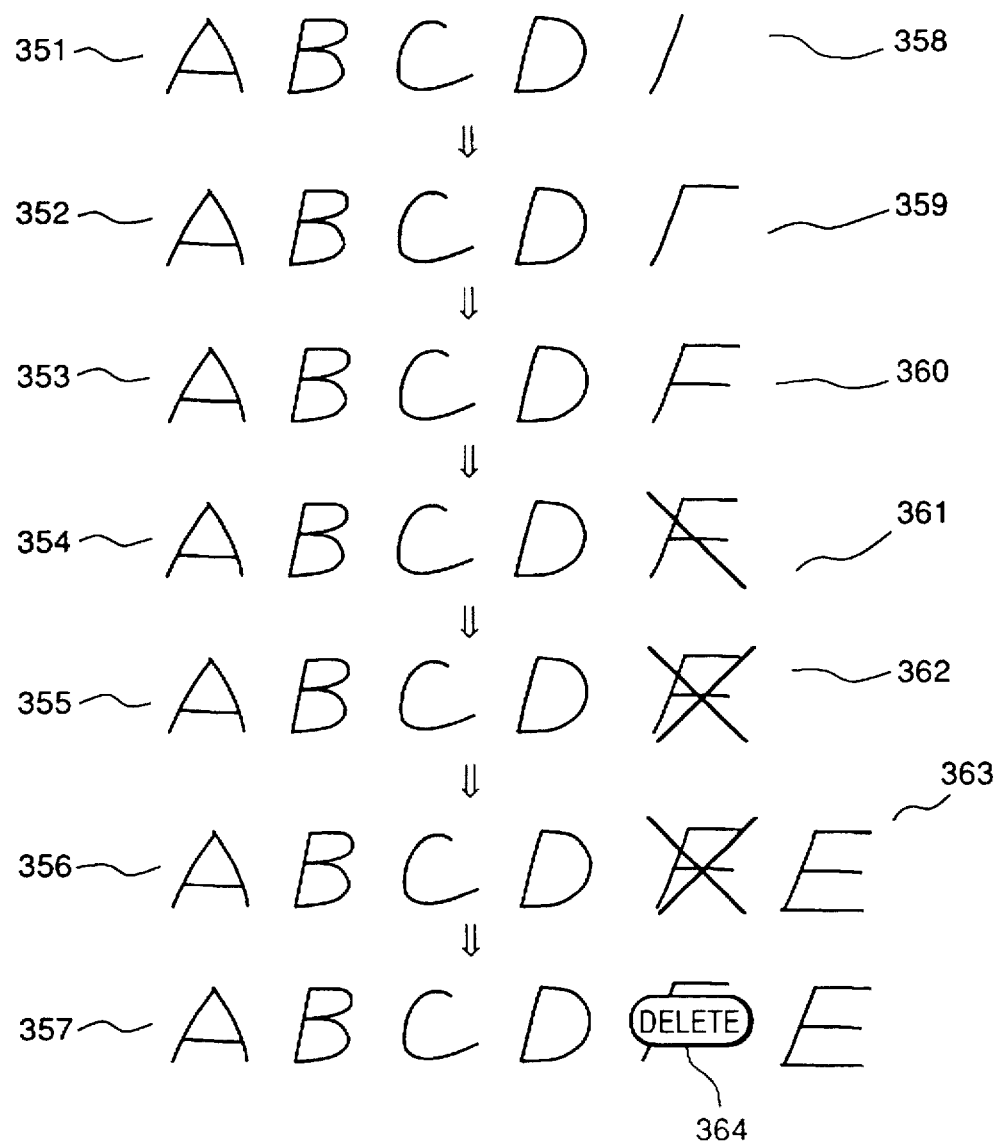
FIG. 4B is a view showing an example of stroke data of an English letter which is sequentially drawn with time.
Figures 5, 6:
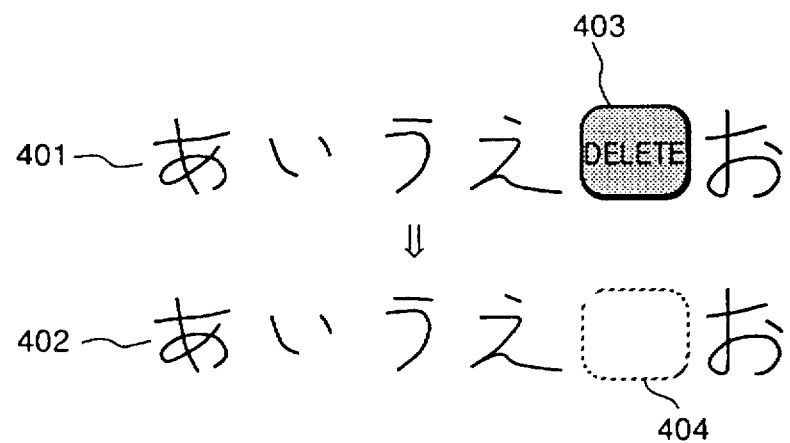
FIG. 5 is a view showing an example of stroke data, which is sequentially drawn with time, after the execution of a gesture command.
FIG. 6 is a view showing an example of stroke data having undergone re-display processing.

FIG. 4A shows an example of stroke data of a Japanese kana character. FIG. 4B shows an example of stroke data of an English letter.

When a stroke input operation is performed by the coordinate input means 101 in FIG. 2 as indicated by reference numeral 301 in FIG. 4A or reference numeral 351 in FIG. 4B, the stroke input processing routine shown in FIG. 3 is started (step S201). In this case, data of a newly added stroke (a stroke 308 in FIG. 4A or 358 in FIG. 4B) is loaded as one-stroke data in step S203 after a temporary memory (not shown) is cleared in step S202. In step S204, the data is output as it is drawn. As a result, stroke data like the one indicated by the uppermost portion in FIG. 4A or 4B is displayed.

Figure 7:
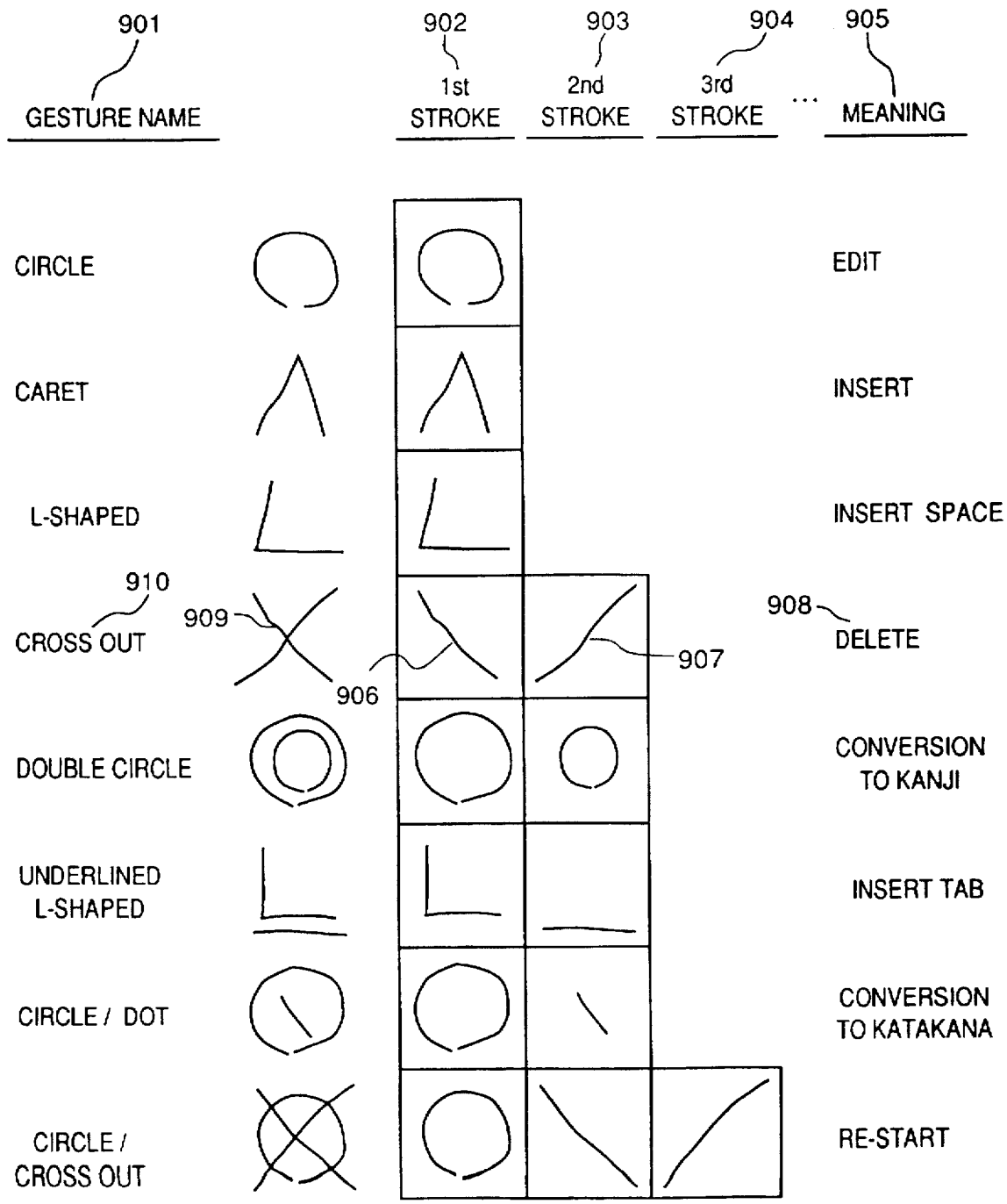
FIG. 7 is a view showing the contents of a gesture dictionary 111 according to the embodiment.

FIG. 7 shows the contents of the gesture dictionary 111 according to this embodiment as simplified and visualized data. In this dictionary, standard data 902 to 904 of the respective strokes of each gesture (901) and a corresponding meaning 905 of the gesture are written.

In step S205 in FIG. 3, as described above, the stroke data is compared with the registered contents of the gesture dictionary 111 which are shown in FIG. 7. If it is determined in step S205, upon comparison with this gesture dictionary, that the stroke data 308 in FIG. 4A (or the stroke data 358 in FIG. 4B) is not part of a gesture, a tap on (selection of) an icon is checked in step S212.

If it is determined in step S212 that the icon is selected, the flow advances to step S214 after gesture command processing is performed in step S213. If it is determined in step S212 that no icon is selected, the presence/absence of a state change (to be described later) is checked in step S214.

If it is determined in step S214 that no state change has occurred, the flow returns to step S203 to load the next stroke data. That is, after the same processing as that for the stroke data 308 (358) is performed for stroke data 309 and 310 (359 and 360 in FIG. 4B) shown in FIG. 4A, stroke data 311 (361) is loaded.

In step S205, it is determined upon comparison with the gesture dictionary 111 that the stroke data 311 (361) coincides with part of "the cross out gesture" (denoted by reference numeral 906) shown in FIG. 7. Therefore, the flow advances to step S2b6.

In step S206, it is checked whether the gesture is completed. That is, with only the stroke data 311 (361), it is determined that the gesture is not completed. For this reason, NO is obtained in step S206. In step S207, the stroke data 311 (361) is stored in the temporary stroke memory.

In step S203, stroke data 312 (362) is loaded. The stroke data is compared with a stroke 907 following the stroke 906 in the gesture dictionary 111. Thereafter, the flow advances to step S206, as in the above case. In this step, it is determined in accordance with the gesture dictionary 111 that the stroke data 311 and 312 in FIG. 4A (361 and 362 in FIG. 4B) are completed as one gesture. In step S208, the meaning of the gesture command is analyzed by using the gesture dictionary 111.

In step S209, the stroke data 311 and 312 (361 and 362 in FIG. 4B) displayed in step S204 are deleted. In step S210, an icon having the meaning "delete" (908) shown in FIG. 7 is displayed. In step S211, the contents of the temporary stroke memory are correlated with the data of a meaning icon (denoted by reference numeral 905 in FIG. 7), and the resultant data is stored in the memory. The flow then returns to step S202 to clear the temporary stroke memory.

As a result, on the display screen, an image like the one indicated by the lowermost portion in FIG. 4A (FIG. 4B) is displayed. The above operation/processing is repeated. As a result, on the display screen, an image stroke data group which does not coincide with any gesture appears, together with an icon group replacing stroke data which coincide with gestures.

In this state, when the operator taps an icon having a function as a gesture he/she wants to execute, the corresponding gesture command is executed in step S213 on the basis of the data stored in step S211. As a result, for example, a blank is displayed, as indicated by reference numeral 404 in FIG. 5.

Assume that the image stroke data on the display screen is to be transferred to an application, or a state change such as the formation of a file or a printing operation occurs (YES in step S214). In this case, in step S215, re-display processing for the image stroke data is performed by using the icon replacing the gesture on the basis of the stroke data stored in step S211 (see FIG. 6). Thereafter, the stroke input processing routine is terminated.

With the above-described arrangement, both image strokes and gestures can be used and identified with the minimum number of operations performed by the user independently of the type of application installed in the apparatus capable of a handwriting input operation.

In addition, re-display processing for image stroke data is performed in accordance with a predetermined state change. Therefore, during or at the end of a handwriting input operation, a desired operation can be performed by only operating only identification symbols indicating necessary gesture operations separately or together, of the identification symbols displayed on the screen and indicating gesture operations.

[First Modification]

A modification of the above embodiment will be described below.

In the above embodiment, when both an image stroke group and an icon group replacing image stroke data identified as gestures are present, a state change such as the formation of a file or a printing operation is used as a condition for re-displaying the icon group as the image stroke group. That is, such a state change is used as a trigger.

The present invention, however, is not limited to this. For example, a timer may be started when image stroke data is replaced with an icon, and the icon may be automatically converted into the image stroke data again to be displayed if no operation is performed with respect to the icon for a predetermined period of time. This will save the user a lot of time and labor to provide a more comfortable operation environment.

Alternatively, when both an image stroke group and an icon group replacing image stroke data identified as gestures are present, all the icon group may be regarded as gestures, and the corresponding gesture commands may be executed at once instead of re-converting the icon group into the image stroke data in response to a trigger such as a timer.

With this arrangement, if the user can determine that all input image stroke data which can be identified as gestures are gestures, a cumbersome operation of manipulating each icon can be omitted.

In addition to commands for operating the respective icons, a command for re-converting all the existing icon group into image stroke data, a command for executing an icon as a gesture command, and the like may be prepared.

[Second Modification]

In the above embodiment, icons are used as identification symbols of image stroke data which can be identified as gestures so as to allow the user to identify them. However, symbols other than icons may be used as symbols for identifying input image stroke data as gestures.

For example, a portion of image stroke data which can be identified as a gesture may be identified by the user by changing the type or color of line on the display.

With this arrangement, the portion which can be identified as the gesture is not obscured by a symbol such as an icon so that the user can visually check the image stroke data exactly as it is drawn. This allows the user to easily determine whether he/she has input data as a gesture.

Note that the present invention may be applied to a system constituted by a plurality of devices or an apparatus constituted by one device. As is apparent, the present invention can also be applied to a case wherein the above-described function is realized by supplying programs to a system or an apparatus.

As has been described above, according to the present invention, no special mode switching is required to input data as image stroke data and input data as gesture commands, and image stroke data and gestures can be easily identified. In addition, since an improvement in device operability is attained, a comfortable operation environment can be provided.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus capable of processing handwritten information, comprising:

means for storing gesture strokes and corresponding icons indicating commands specified by corresponding gesture strokes;

means for inputting handwritten stroke data;

recognition means for recognizing that a stroke included in the handwritten stroke data is identical to one of the gesture strokes;

means for displaying a stored icon corresponding to the recognized gesture stroke at a position where the recognized gesture stroke was input on a display screen;

judging means for judging the presence or absence of a selection of the displayed icon, at the position where the icon is displayed; and selection means for selecting, in accordance with the judgment, to execute a command specified by the displayed icon.

2. The apparatus according to claim 1, further comprising means for performing re-display processing for the handwritten stroke data, wherein said selection means performs a selecting operation to execute the command specified by the recognized gesture stroke in a case that said judging means judges the presence of a selection of the corresponding icon, and wherein said means for performing re-display processing performs re-display processing in a case that said judging means judges the absence of a selection of the corresponding icon.

3. The apparatus according to claim 2, wherein re-display processing for the handwritten stroke data is performed on the basis of a predetermined state change.

4. The apparatus according to claim 3, wherein the predetermined state change includes at least a state chance in which a selection is not made for a predetermined period of time, the handwritten stroke data is transferred to an application, a file is formed, or a printing operation occurs.

5. The apparatus according to claim 4, wherein the command specified by the gesture stroke is executed with respect to all the displayed icons when a selection is not made for said predetermined period of time.

6. The apparatus according to claim 1, wherein a predetermined symbol representing the handwritten stroke data, which can be identified as the command specified by the recognized gesture stroke, is attached to the icon.

7. An information processing method capable of processing handwritten information, comprising the steps of:
   recognizing a stroke identical to one of a plurality of stored gesture strokes, the gesture strokes corresponding to icons indicating commands specified by corresponding gesture strokes, the recognized stroke included in handwritten stroke data;
   displaying an icon corresponding to the recognized gesture stroke at a position where the recognized gesture stroke was input on a display screen;
   judging the presence or absence of a selection of the displayed icon at the position where the icon is displayed; and
   selecting, in accordance with the judgment, to execute a command specified by the displayed icon.

8. The method according to claim 7, further comprising the step of performing re-display processing for the handwritten stroke data,
   wherein, in said selection step, a selecting operation is performed to execute the command specified by the recognized gesture stroke in a case that, in said judging step, the presence of a selection of the icon is judged, and
   wherein re-display processing is performed in a case that, in said judging step, the absence of a selection of the icon is judged.

9. The method according to claim 8, wherein re-display processing for the handwritten stroke data is performed on the basis of a predetermined state change.

10. The method according to claim 9, wherein the predetermined state change includes at least a state change in which a selection is not made for a predetermined period of time, the handwritten stroke data is transferred to an application, a predetermined file is formed, or a printing operation occurs.

11. The method according to claim 10, wherein the command specified by the recognized gesture stroke is executed with respect to all the displayed icons when a selection is not made for said predetermined period of time.

12. The method according to claim 7, wherein a predetermined symbol representing the handwritten stroke data, which can be identified as the command specified by the recognized gesture stroke is attached to the icon.

13. An information processing apparatus capable of processing handwritten information, comprising:
   means for storing stroke data and corresponding icons indicating commands specified by corresponding stroke data;
   means for inputting handwritten image data;
   recognition means for recognizing a meaning of a stroke included in the handwritten image data which is identical to one of the stored stroke data;
   means for displaying a corresponding stored icon corresponding to said recognized meaning at a position where the stroke was input on a display screen;
   judging means for judging the presence or absence of a selection of the displayed icon at the position where the icon is displayed; and
   selection means for selecting, in accordance with the judgment, to make the displayed icon active.

14. The apparatus according to claim 13, further comprising means for performing re-display processing for the handwritten image data,
   wherein said selection means performs a selecting operation to execute an operation having the meaning corresponding to said icon in a case that said judging means judges the presence of a selection of the icon, and
   wherein said means for performing re-display processing performs re-display processing in a case that said judging means judges the absence of a selection of the predetermined icon.

15. The apparatus according to claim 14, wherein re-display processing for the handwritten image data is performed on the basis of a predetermined state change.

16. The apparatus according to claim 15, wherein the predetermined state change includes at least a state change in which a selection is not made for a predetermined period of time, the handwritten image data is transferred to an application, a file is formed, or a printing operation occurs.

17. The apparatus according to claim 16, wherein an operation having the meaning corresponding to said icon is executed with respect to all displayed icons when a selection is not made for said predetermined period of time.

18. An information processing method capable of processing handwritten information, comprising the steps of:
   recognizing a stroke identical to one of a plurality of stored strokes, the strokes corresponding to stored icons indicating commands specified by the strokes, the recognized stroke included in handwritten image data;
   displaying a corresponding stored icon corresponding to a meaning of said recognized stroke at a position where the recognized stroke was input on a display screen;
   judging the presence or absence of a selection of the displayed icon at the position where the icon is displayed; and
   selecting, in accordance with the judgment, to make displayed icon active.

19. The method according to claim 18, further comprising the step of performing re-display processing for the handwritten image data,
   wherein, in said selection step, a selecting operation having the meaning corresponding to said icon is performed in a case that, said judging step, the presence of a selection of the icon is judged, and
   wherein re-display processing is performed in a case that, in said judging step, the absence of a selection of the icon is judged.

20. The method according to claim 19, wherein the restoration to the re-display processing for the handwritten image data is performed on the basis of a predetermined state change.

21. The method according to claim 20, wherein the predetermined state change includes at least a state change in which a selection is not made for a predetermined period of time, the handwritten data is transferred to an application, a predetermined file is formed, or a printing operation occurs.

22. The method according to claim 21, wherein an operation having the meaning corresponding to said icon is not made for said predetermined period of time.

23. A computer-readable storage medium holding program codes for processing handwritten information, comprising:

- a program code to recognize a stroke identical to one of a plurality of stored gesture strokes, the gesture strokes corresponding to icons indicating commands specified by the gesture strokes, the recognized stroke included in handwritten stroke data;
- a program code to display an icon corresponding to the recognized gesture stroke at a position where the recognized gesture stroke was input on a display screen;
- a program code to judge the presence or absence of a selection of the displayed icon at the position where the icon is displayed; and
- a program code to select, in accordance with the judgment, to execute a command specified by the displayed icon.

24. A computer-readable storage medium holding program codes for processing handwritten information, comprising:

- a program code to recognize a stroke identical to one of a plurality of stored strokes, the stored strokes corresponding to icons indicating commands specified by the strokes, the recognized stroke included in handwritten image data;
- a program code to display an icon corresponding to a meaning of said recognized stroke at a position where the recognized stroke was input on a display screen;
- a program code to judge the presence or absence of a selection of the displayed icon at the position where the icon is displayed; and
- a program code to select, in accordance with the judgment, to make the displayed icon active.

* * * * *

UNITED STATES PATENT AND TRADEMARK OFFICE
CERTIFICATE OF CORRECTION

PATENT NO. : 5,781,662

DATED : July 14, 1998

INVENTORS : Shigeki Mori, et al.                    Page 1 of 2

It is certified that error appears in the above-identified patent and that said Letters Patent is hereby corrected as shown below:

ON THE TITLE PAGE:

Under [56] References Cited, please insert
-- FOREIGN PATENT DOCUMENTS

```
0 565 872     10/20/93     Europe
61-62002      6/10/94      Japan
```

OTHER PUBLICATIONS

"Stylus User Interfaces For Manipulating Text", D. Goldberg, et al., Proceedings Of The ACM Symposium On User Interface Software And Technology, November 11-13, 1991, pgs. 127-135.

"The Point Of The Pen", R.M. Car, Byte, Vol. 16, No. 2, February 1991, pgs. 211-221. --

COLUMN 2

Line 52, "reference-numeral" should read --reference numeral--.

COLUMN 4

Line 19, "the.gesture" should read --the gesture--;
Line 47, "S2b6" should read --S206--; and
Line 51, "is-obtained" should read --is obtained--.

UNITED STATES PATENT AND TRADEMARK OFFICE
CERTIFICATE OF CORRECTION

PATENT NO. : 5,781,662

DATED : July 14, 1998

INVENTORS : Shigeki Mori, et al.

It is certified that error appears in the above-identified patent and that said Letters Patent is hereby corrected as shown below:

COLUMN 7

Line 2, "chance" should read --change--; and
Line 54, "stroke" should read --stroke,--.

Signed and Sealed this

Eleventh Day of July, 2000

Attest:

Q. TODD DICKINSON

*Attesting Officer*     *Director of Patents and Trademarks*